United States Patent
Berg

(10) Patent No.: US 12,442,763 B2
(45) Date of Patent: Oct. 14, 2025

(54) METHOD FOR DETECTING PRIMARY GAS FLOWS IN FLOW CHAMBERS, USE OF A GAS MIXTURE THEREFOR AND GAS MIXTURE

(71) Applicant: LaVision GmbH, Goettingen (DE)

(72) Inventor: Thomas Berg, Goettingen (DE)

(73) Assignee: La Vision GmbH, Goettingen (DE)

( * ) Notice: Subject to any disclaimer, the term of this patent is extended or adjusted under 35 U.S.C. 154(b) by 679 days.

(21) Appl. No.: 17/777,473

(22) PCT Filed: Nov. 19, 2020

(86) PCT No.: PCT/EP2020/082737
§ 371 (c)(1),
(2) Date: May 17, 2022

(87) PCT Pub. No.: WO2021/099494
PCT Pub. Date: May 27, 2021

(65) Prior Publication Data
US 2022/0404277 A1 Dec. 22, 2022

(30) Foreign Application Priority Data
Nov. 20, 2019 (DE) .................. 10 2019 131 328.7

(51) Int. Cl.
*G01N 21/45* (2006.01)
*G02B 27/48* (2006.01)
(Continued)

(52) U.S. Cl.
CPC ........... *G01N 21/455* (2013.01); *G02B 27/48* (2013.01); *G02B 27/54* (2013.01); *G01N 2021/151* (2013.01)

(58) Field of Classification Search
CPC ........... G01N 2021/151; G01N 21/455; G02B 27/48; G02B 27/54
(Continued)

(56) References Cited

U.S. PATENT DOCUMENTS 3,617,130 A * 11/1971 Kelley .................. G02B 27/54
356/520
5,127,264 A 7/1992 Schmalz
(Continued)

FOREIGN PATENT DOCUMENTS

DE 19942856 7/2009
DE 102010030143 12/2011
(Continued)

OTHER PUBLICATIONS

Katsuyoshi Tanimizu et al. "Drag force on 1-14 quasi-axisymnietric scramjets at variousflight Mach numbers: theory and experiment". Shock Waves; An International Journal on Shock Waves, Detonations and Explosions—Published Under the Auspices of the International Shock Wave Instiute, Springer, Berlin, DE vol. 19, No. 2, Mar. 13, 2009 (Mar. 13, 2009), pp. 83-93, XP019701276, ISSN: 1432-2153 pp. 85-86; drawing 2, 9.
(Continued)

*Primary Examiner* — Tarifur R Chowdhury
(74) *Attorney, Agent, or Firm* — Gerald E. Hespos; Michael J. Porco

(57) ABSTRACT

A method is provided for detecting primary gas flows (18) in flow chambers (10). The primary gas (18) flowing in a flow chamber (10) is locally seeded with a seed substance and the movement of the seed substance, representative of the flow of the primary gas (18), is detected by imaging by an image detector (28) and an imaging optics (30) arranged in front of said image detector (28). A gas mixture (34) that moves along with the primary gas (18) without relative
(Continued)

motion and that has a refractive index distinguishable from that of the primary gas (18) is used as the seed substance, and imaging detection is carried out by a background schlieren measurement method.

12 Claims, 1 Drawing Sheet

(51) Int. Cl.
G02B 27/54 (2006.01)
G01N 21/15 (2006.01)
(58) Field of Classification Search
USPC .......................................................... 356/512
See application file for complete search history.

(56) References Cited

U.S. PATENT DOCUMENTS

| | | | |
|---|---|---|---|
| 5,153,665 A | 10/1992 | Weinstein | |
| 7,385,703 B2 * | 6/2008 | Berg | G01L 11/02 356/436 |
| 2020/0138292 A1 * | 5/2020 | Choi | A61B 5/091 |
| 2022/0080227 A1 * | 3/2022 | Cohen | A62B 9/00 |

FOREIGN PATENT DOCUMENTS

| | | | | |
|---|---|---|---|---|
| DE | 112018002304 T5 * | 2/2020 | | G01P 5/22 |
| DE | 102019131328 B3 * | 4/2021 | | G02B 27/48 |
| DE | 102023133259 B3 * | 4/2025 | | G06T 7/55 |
| JP | 2005-282892 | 10/2005 | | |
| WO | WO-9118277 A1 * | 11/1991 | | G01N 21/15 |
| WO | WO-9403794 A1 * | 2/1994 | | G01N 21/65 |

OTHER PUBLICATIONS

Kotchourko N et al.: "Concentration measurements in a round hydrogen jet using Background Oriented Schlieren (BOS) technique". International Journal of Hydrogen Energy, Elsevier Science Publishers B. V., Barking GB, vol. 39, No. 11, Dec. 2013 (Dec. 2013), pp. 6201-6209, XP028832487, ISSN: 0360-3199, DO1: 10.1016/J. IJHYDENE.2013.10.152 p. 6202 p. 6204; drawing 1-4,6.
Michalski Quentin et al.: "An application 1-14 of speckle-based background oriented schlieren for optical calorimetry" Experimental Thermal and Fluid Science, vol. 91,Sep. 9, 2017 (Sep. 9, 2017), pp. 470-478, XP085320183, ISSN: 0894-1777, DOI: 10.1016/J. EXPTHERMFLUSCI.2017.09.012 Abstract; drawings 1-7.
Meier, Alexander H.; Roesgen, Thomas: Improved background oriented schlieren imaging using laser speckle illumination. In: Experiments in Fluids, vol. 54, 2013, Article No. 1549 (p. 1-6). ISSN 0723-4864 (P); 1432-1114 (E). DCI: 10.1007/s00348-013-1549-8. URL: https://link.springer.com/content/pdf/1 0.1 007% 2Fs00348-01 3-1 549-8.pdf [retrieved on: Jan. 23, 2020].
Research on new flow field visualization technology (Background Oriented Schlieren: BOS) May 5, 2019, Jun. 29, 2019.

* cited by examiner

METHOD FOR DETECTING PRIMARY GAS FLOWS IN FLOW CHAMBERS, USE OF A GAS MIXTURE THEREFOR AND GAS MIXTURE

BACKGROUND

Field of invention. The invention relates to a method for detecting, in particular, slow primary gas flows, i. e. primary gas flows with, in particular, a flow velocity of 0.1 to 1 m/s, preferably of 0.3 to 0.5 m/s, in flow chambers, wherein the primary gas flowing in a flow chamber is locally seeded with a seed substance and the movement of the latter, representative of the flow of the primary gas, is detected by imaging by means of an image detector and an imaging optics arranged in front of said image detector.

Prior art Filling processes in the pharmaceutical industry, for example the filling of pharmaceutical liquids into vials intended for sale, are typically carried out in so-called flow boxes. These flow boxes are hoods, usually with transparent walls, that surround a filling device arranged on a workbench and through which sterile filtered air flows in order to prevent any external entry of non-sterile substances. Such air flow, also referred to here as primary gas flow, has to follow defined specifications. In particular, the primary gas flows typically involves slow flows with flow velocities of 0.3 to 0.5 m/s, which flow through the flow chamber, i. e. here the flow box, in a preferably laminar manner from top to bottom and penetrate to the outside exclusively at predetermined outlet openings. However, the flow is disturbed by structures around which it flows and by objects introduced into the flow box. Nevertheless, compliance with the defined flow parameters is an essential quality criterion for the filling process and is subject to strict regulatory control. In the USA, for example, the local health authority, FDA, stipulates regular inspection and documentation of the flow properties. A procedure prescribed for this purpose stipulates that the primary gas flow is seeded locally via nozzles with a glycol aerosol as a seed substance. Incident light is scattered by the aerosol so that the aerosol movement through the transparent walls of the flow box can be detected optically, in particular captured by a video camera, and can be recorded. Since the aerosol is by definition composed of floating particles that move with the primary gas flow, the recorded movement of the aerosol can be assumed to be representative of the movement of the primary gas. The disadvantage here is the considerable contamination of the actual filling device resulting from its wetting with the glycol aerosol. Intensive cleaning of the filling device is therefore required after each flow check before it can be put into operation again.

Similar scenarios are known to the skilled person from other areas, such as the packaging of foodstuffs under protective gas flows or in the forced ventilation of rooms, for example in server farms or also in living rooms or the interiors of motor vehicles. In all cases, visualization of the respective primary gas flow typically takes place by seeding with an aerosol, which leads to the disadvantages mentioned above.

From the field of aerospace technology, documented for example in DE 199 42 856 B4, the so-called background schlieren measurement method is known, which often is referred to by the English abbreviation BOS (Background Oriented Schlieren). In high velocity flows, large pressure gradients and therefore large local mass density differences occur within the flow. These mass density differences cause corresponding differences in the refractive index of the flowing gas. In the BOS method, a patterned background is positioned behind the flow to be visualized and an image detector directed at this background is positioned in front of the flow. The imaging of the background on the image detector depends on the specific path that the light travels from a given background point to the image detector, where this path depends on the deflection properties, i. e., in particular, on the refractive index of the medium being passed between the background and the image detector. As explained above, the refractive index of the flow flowing between the background and the image detector can differ locally, so that the rays falling on the image detector from different background points experience different deflections on their way. The resulting changes in the detected pattern can be calculated using known correlation methods and thus refractive index gradients can be made visible. Correlation algorithms known to those skilled in the art can be used for the calculation. For visualization, each pixel of the image detector is assigned the value of the refractive index variation calculated at the corresponding location and coded in color or by gray scale. It is also possible to superimpose this BOS image on a conventional image of the scenario. Image processing techniques can also be used as part of the BOS approach to flow visualization. However, all of them rely on the spatially resolved measurement of flow-induced refractive index variations, which are reflected in the time-varying image of a patterned background through the flow to be visualized. The BOS method is also suitable for visualizing thermal flows, i. e. when the relevant density differences are generated by temperature differences, such as local heating of the flow.

The patterned background required for the BOS process typically is provided by an appropriately patterned surface. The pattern may be printed, pasted, projected, or otherwise applied to the surface in a manner detectable by the image detector. The above-mentioned document additionally discloses the possibility of using natural backgrounds, the natural patterning of which is sufficient to perform the BOS method outlined above, given a suitably high resolution of the image detector and sufficient computing capacity.

From Meier, A. H.; Roesgen, Th.: *"Improved background oriented schlieren imaging using laser speckle illumination" Exp. Fluids* (2013) 54: 1549 (DOI 10.1007/s 00348-013-1549-8) it is known to use as background for a BOS-based visualization of a thermal flow a projection surface positioned behind—as seen from the image detector—a candle flame, which is irradiated with coherent light over a large area, i. e. coherently illuminated. Such coherent illumination results in so-called laser speckles due to interference phenomena, which essentially appear as a dot pattern. Depending on the respective spatial mass density and consequently on the refractive index constellation, this dot pattern is imaged differently on the image detector. For the rest, reference can be made to the above explanation of the classical BOS method.

It is an object of the present invention to further develop the generic method for detecting, in particular, slow primary gas flows in flow chambers in such a way that no disadvantageous contamination of the flow chamber occurs.

SUMMARY

The invention provides a gas mixture that moves along with the primary gas without relative movement, hereinafter also referred to as seed gas. The seed gas has a refractive index distinguishable from the primary gas, is used as the seed substance, and the imaging detection is carried out by means of a background schlieren measurement method (BOS method).

The present invention is based on two ideas. According to the first idea, the aerosol, which is disadvantageous because of the pollution it causes, is as the seed substance replaced by a gas mixture that is suitable for moving along with the primary gas without relative motion, i. e., the seed gas must have a mass density similar to that of the primary gas. In the present context, "free of relative motion" is to be understood in the sense of "without inherent motion caused by mass differences" in such a way that, during the execution of the method, i. e. at the respective flow velocities and distances flowed through, no deviations (in direction and magnitude) occur between the flow velocities of the primary gas and the seed gas, or at least no deviations that are significant for the desired measurement accuracy. As mentioned above, typical flow velocities are in the range of 0.1 to 1.0 m/s, preferably in the range of 0.3 to 0.5 m/s. The typically relevant distances are the length dimensions of the respective flow chamber. The skilled person will understand that the greater the flow velocities of the primary gas to be detected and the smaller the distances flowed through in each case, the greater the tolerable deviation between the mass density of the seed gas and the primary gas can be in order to still achieve the absence of relative movement between the seed gas and the primary gas relevant to the invention. A seed gas that is significantly heavier than the primary gas would sink regardless of the primary gas flow, whereas a significantly lighter seed gas would rise. In either case, the seed gas motion would no longer be representative of the primary gas flow to the desired degree.

This approach avoids the problem of contamination within the flow chamber that occurs when an aerosol is used as the seed substance. However, seed gas and primary gas are indistinguishable to conventional cameras and, because typically transparent in the optical spectral range, are even invisible. Therefore, as a further basic idea, the invention provides for the detection of the seed gas by means of a background schlieren measurement method basically known to the person skilled in the art. For this purpose, however, it is necessary that the seed gas has a refractive index distinguishable from the primary gas (in the context of the BOS method). Any other type of optical distinguishability, for example color differences or scattering as in the case of an aerosol, is not required and not even desired in the context of the present invention. It will be understood by those skilled in the art that the aforementioned properties of the seed gas relative to the primary gas, namely similar mass density and dissimilar refractive index, must be present under the same pressure and temperature conditions. This is because neither—due to the typically slow flow velocities—are the naturally occurring pressure differences in the flow large enough to provoke corresponding refractive index variations. Nor is it envisaged within the scope of the invention to generate larger temperature differences between primary and seed gas, which would be lost in the course of the flow anyway.

The just local seeding of the primary gas with the seed gas ensures that the corresponding refractive index perturbation is also local and, in particular, moves through the flow chamber with the primary gas flow. And because, as explained above, the BOS method is based on the detection of temporal changes in refractive index differences, the perturbation that can be visualized using BOS can be assumed to be representative of the primary gas flow. Therefore, the method according to the invention enables an indirect visualization of the primary gas flow.

It is of particular importance for the invention that the seed gas is a gas mixture, i. e. a composition of different types of pure gas. Only in this way is it possible to produce a seed gas with the essential properties of the invention with respect to mass density and refractive index, as already explained above. In this connection, as the inventors have found, there is no need to fear that the different gas components of the seed gas would split up in the course of carrying out the process according to the invention and, in particular, would assume an undesirable relative motion to the primary gas due to the different mass densities of their pure forms. Instead, the properties of the composite gas mixture are retained.

A gas mixture of 20% oxygen, 25% helium and 55% argon has proved to be a particularly advantageous, exemplary seed gas for air as the primary gas, especially in the case of slow movement of the primary gas, with deviations of +/−1% in each case being regarded as uncritical. Such a gas mixture has a molar mass of 29.3 g/mol and a refractive index n' of 215 (given as $(n-1) \times 10^6$; where n is the dimensionless refractive index). The molar mass difference to air of 1.5 g/mol is therefore sufficiently small, so that even at low flow velocities over several meters no relative motion to the primary gas air is to be feared. On the other hand, the refractive index difference of −73 is sufficiently large that a BOS-based detection method leads to very good results with regard to visualization of the flow.

The following table gives further, exemplary gas mixtures that are suitable as seed gas for processes according to the invention with air as primary gas, as well as their difference in molar mass and refractive index to air. On the basis of these exemplary specifications, it will be easy for the person skilled in the art to put together the optimum gas mixture for his particular application (primary gas, flow velocity, distance flowed through, resolving power of the image detector, . . . ) and, if necessary, also to take into account economic aspects resulting from the different prices for different pure gases.

TABLE 1

| Gas | Molar mass [g/mol] | Refractive index n' $[(n-1) \cdot 10^6]$ | Seed gas 1 | Seed gas 2 | Seed gas 3 |
| --- | --- | --- | --- | --- | --- |
| He | 4.0 | 35 | 25% | 55% | 65% |
| Ar | 39.9 | 283 | 55% | — | — |
| Kr | 83.8 | 429 | — | 25% | — |
| Xe | 131.0 | 689 | — | — | 15% |
| $O_2$ | 32.0 | 252 | 20% | 20% | 20% |
| Air | 28.8 | 288 | — | — | — |
| Molar mass [g/mol] | | | 29.3 | 29.6 | 28.7 |
| Refractive index n' $[(n-1) \cdot 10^6]$ | | | 215 | 177 | 177 |
| Difference molar mass to air [g/mol] | | | 0.5 | 0.8 | −0.1 |
| Difference refractive index to air $[(n-1) \cdot 10^6]$ | | | −73 | −111 | −111 |

In any case, deviations of +/−1% in the quantities of the individual gas components are largely uncritical.

As a general formula for a gas mixture considered favorable as a seed gas, having the properties of sufficient freedom of relative motion and sufficient distinguishability of refractive index, it can be written:

$|m_P - \Sigma_{i=1}^N a_i m_i| < 2$ g/mol, preferably <1 g/mol, more preferably ≤0.5 g/mol, and $|n'_P - \Sigma_{i=1}^N a_i n'_i| > 70$, preferably ≥100, particularly preferably 110, where $m_P$ is the molar mass and $n'_P$ is the refractive index of the primary gas, $m_i$ is the molar mass and $n'_i$ is the refractive index of the i-th gas component of the seed gas, N is the number of gas components of the seed gas and $a_i$ is their respective relative molar fraction in the seed gas. In other words, favorably, the absolute amount of the difference between the molar mass of the primary gas and the seed gas is less than 2 g/mol, preferably less than 1 g/mol, more preferably less than or equal to 0.5 g/mol, and the absolute amount of the difference between the refractive index of the primary gas and the seed gas is greater than 70, preferably greater than 100, more preferably greater than or equal to 110. The molar mass and the refractive index of the seed gas are thereby calculated as the corresponding values of the gas components of the seed gas averaged with their respective relative molar fractions. The individual gas components are preferably pure gases and not themselves already gas mixtures, wherein preferably 1<N<6, i. e. at least 2 and at most five, preferably three or four, particularly preferably exactly three pure gases are used to produce the gas mixture.

Of course, other pure gases not listed in the above table can also be used as components of a seed gas according to the invention. However, particularly in typical applications where the flow chamber in question is not separated gastightly from any human personnel during normal operation, it is advisable for the gas mixture to contain only gas components that are non-toxic and non-asphyxiant to humans. In explosive applications, on the other hand, the use of oxidative gases should be avoided. Such restrictions on the gases that can be used will be particularly relevant in the context of occupational safety regulations.

In some embodiments, the seeding of the primary gas with the seed gas takes place by means of one or more diffusers. In contrast to introduction via a nozzle, the seed gas is introduced into the primary gas flow via a diffuser with virtually no movement of its own, so that no relative movement can occur due to an initial inherent velocity of the seed gas. The diffuser(s) together with the connected seed gas supply line can be arranged movably, in particular displaceably, within the flow chamber in question so that the flow distribution can be visualized in the entire flow chamber.

In some embodiments, it is provided that the patterned background required for the background schlieren measurement method is generated by coherently illuminating a projection surface located in the field of view of the image detector behind the primary gas flow.

At least areas of the projection surface may be formed by a boundary wall of the flow chamber. Alternatively or additionally, it can be provided that at least areas of the projection surface are formed by an outer wall of an object arranged in the flow chamber. A transparent wall between the image detector and the projection surface, e. g. a front window of a flow box, is in principle not harmful in this respect.

Indeed, a particular advantage of the laser speckle BOS method is that the laser speckle pattern is always sharply imaged on the image detector regardless of the distance setting of the imaging optics. This property results from the physics of interference that underlies the formation of the laser speckle pattern. On the other hand, it is known from conventional BOS variants with real background patterns that the further the distance between the flow to be visualized and the patterned background on which the imaging optics must be focused for its sharp imaging, the greater the sensitivity of the method. The reason for this is that the light deflection perturbation underlying the visualization is an angular phenomenon that becomes more pronounced the longer the paths traversed. A large distance between flow and background is not problematic for conventional BOS methods, such as those used in aerospace engineering. For measurements in confined flow chambers, on the other hand, the dimensions are typically much smaller and of particular interest are flows in the immediate vicinity of walls—be they boundary walls of the flow chamber itself or be they outer walls of objects located in the flow chamber, such as superstructures or instruments. This is especially true, for example, for the preferred use case of flow visualization in flow boxes. If a real patterned background is installed here on the rear wall of the flow box opposite the image detector and the imaging optics are focused on this background, this leads to a significantly limited sensitivity of the method. However, when using the laser speckle BOS method, as preferably provided within the scope of the present invention, the laser speckle pattern can be projected directly onto the flow box back wall, carriers in the flow box and/or even onto the vessels themselves to be filled in the flow box. The imaging optics of the image detector, on the other hand, can be set to a point behind the projection surface (which may be composed of multiple planes), thereby virtually shifting the pattern to the rear. The sensitivity of the measurement increases accordingly.

In order to also be able to sharply image the flow chamber area in which the flow movement to be visualized takes place during such a remote setting of the imaging optics, it is preferably provided that the imaging optics are stopped down in such a way that the primary gas flow lies in the sharply imaged distance area. In other words, by means of the imaging optics, a depth of field is realized which includes the structures located in the flow area, although the imaging optics are focused on a point located behind the actual projection screen in order to increase sensitivity.

In some embodiments, the coherent illumination of the projection screen is performed by means of a laser which is aligned coaxially to the optical axis of the image detector and which radiates through the flow. This has proven to be particularly favorable with regard to imaging precision. It can be provided that light from a laser that is not aligned coaxially to the optical axis of an image detector is redirected to the optical axis of the image detector by means of a beam splitter. The light detected by the image detector thus passes twice through the refractive index perturbation: a first time as projection light on its way to the projection screen and a second time as detection light on its way from the projection screen to the image detector. This amplifies the beam deflection caused by the refractive index interference. However, non-coaxial alignment of projection and detection light results in so-called ghost images on the detector, which are disturbing for image evaluation. Of course, it is also conceivable to illuminate the projection screen without prior passage of the projection light through the flow or to irradiate it at such an angle that the resulting ghost image is deflected outside the sensitive detector area.

Further details and advantages of the invention will be apparent from the following specific description and drawings.

DESCRIPTION OF PREFERRED EMBODIMENTS

Identical reference signs in the figures indicate identical or analogous elements.

Figure 1:
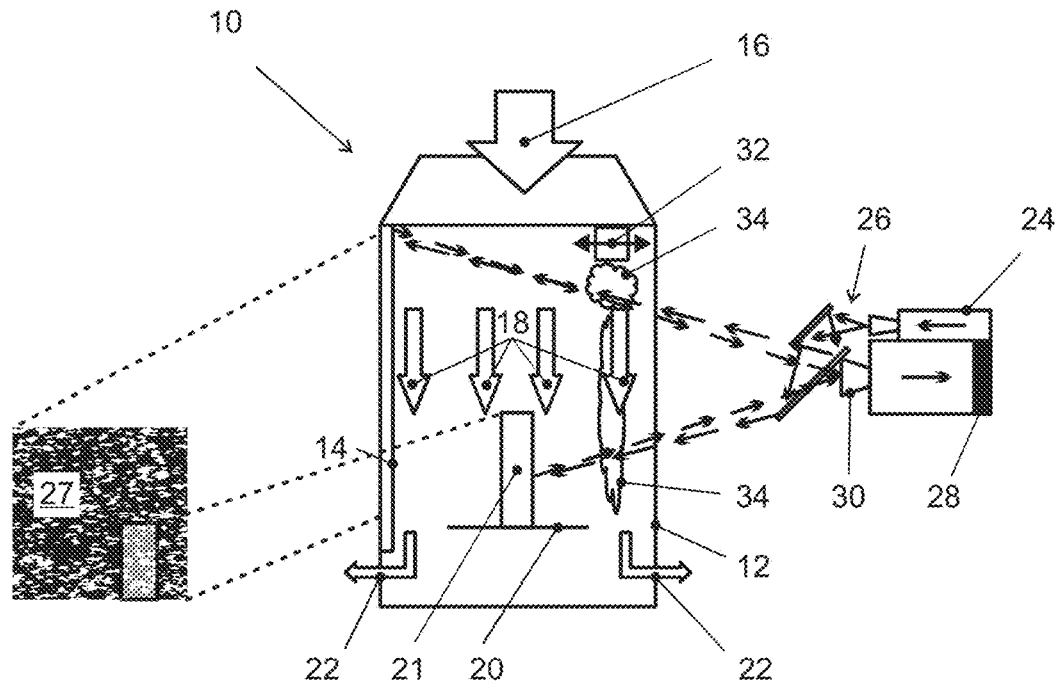
FIG. 1 is a schematic representation of the implementation of the method according to the invention for the visualization of air flows in a flow box.

FIG. 1 illustrates in highly schematic sketch of a structure for carrying out a process according to the invention using the example of a so-called flow box 10. The flow box 10 has a transparent front wall 12 and a matted rear wall 14. The matting of the rear wall 14 can be carried out, for example, by applying a matting screen, for example a white paper, to the outside or inside of a transparent rear wall 14. In the case of a non-transparent rear wall 14, such measures are unnecessary. In its upper region, the flow box 10 has an air connection 16, symbolized as an arrow, via which sterile filtered air can be introduced into the interior of the flow box 10. In the embodiment described, this sterile filtered air serves as the primary gas. Of course, other primary gas types can also be used within the scope of the invention.

Via air guide elements not shown in detail, the introduced primary gas is deflected into a primary gas flow 18 also shown as arrows, which in the embodiment shown flows essentially laminarly downward 12, 14 of the flow box 10. Any type of apparatus, in particular a filling apparatus for pharmaceutical liquids, may be installed on a work table 20 within the flow box 10. Other types of equipment are of course also conceivable within the scope of the invention. In FIG. 1, such installations or inserted objects are shown schematically as an obstacle 21. In the lower area of the flow box 10, lateral air outlets 22 are arranged, which are provided as exclusive outlets for the primary gas flow 18.

The method according to the invention can be used to check whether the primary gas flow 18 actually follows the desired flow path. For this purpose, a laser speckle pattern is projected onto the rear wall 14 and the outer wall of the obstacle 21 (insofar as it covers the rear wall 14), which to this extent act as a composite projection surface. For this purpose, a laser 24 is provided whose laser radiation, preferably lying in the optical spectral range, and is projected onto the projection surface by means of suitable deflection and expansion optics 26. A laser speckle pattern 27 is created, which is indicated as an example on the left in FIG. 1. This laser speckle pattern 27 is detected by means of an image detector 28 with an imaging optics 30 arranged in front of the image detector. In the embodiment shown, the deflection and expansion optics 26 of the laser 24 are designed so that the optical axis of the projection of the laser speckle pattern 27 is coaxial with the optical axis of its imaging on the image detector 28.

A seed gas 34, i. e. a gas mixture having the properties discussed in detail within the general description, is added to the primary gas flow 18 via a movable diffuser 32 within the flow box 10. The movability of the diffuser 32 allows for easy variation of the seeding location to create a spatial flow pattern. The seed gas 34 introduced into the primary gas flow 18 via the diffuser 32 with virtually no inherent velocity follows the primary gas flow 18 without relative motion, but it creates a local perturbation of the refractive index of the flow 18. This refractive index perturbation acts in two ways. First, it changes the projection of the laser speckle pattern 27 onto the projection surface; second, it affects the imaging of the pattern 27 onto the image detector 28. Since the seed gas 34, and therefore the refractive index perturbation it produces, moves with the primary gas flow 18, the refractive index perturbation is subject to temporal changes. Temporally successive images, in particular with time intervals of significantly less than 1 second, preferably less than $\frac{1}{10}$ second, particularly preferably less than $\frac{1}{100}$ second and comparison of the resulting images, in particular by correlation algorithms, then allows a calculation and display of the respective spatially assigned value of the caused perturbation. Thus a visualization of the primary gas flow 18 disturbed in such a way is possible. Its correct course can therefore be checked in quasi-real time by means of the method according to the invention. At the same time, the internal structure of the flow box 10, in particular the obstruction 10, remains at least schematically recognizable. To improve the recognizability of such details, "normal" images with non-coherent illumination can be taken in between and superimposed on the calculated BOS images. In the usual case where the spectrally narrowband laser illumination is in addition to a broadband ambient illumination, different cameras with appropriate filters can also be used for recording the BOS images on the one hand and the "normal" images on the other.

Figure 2:
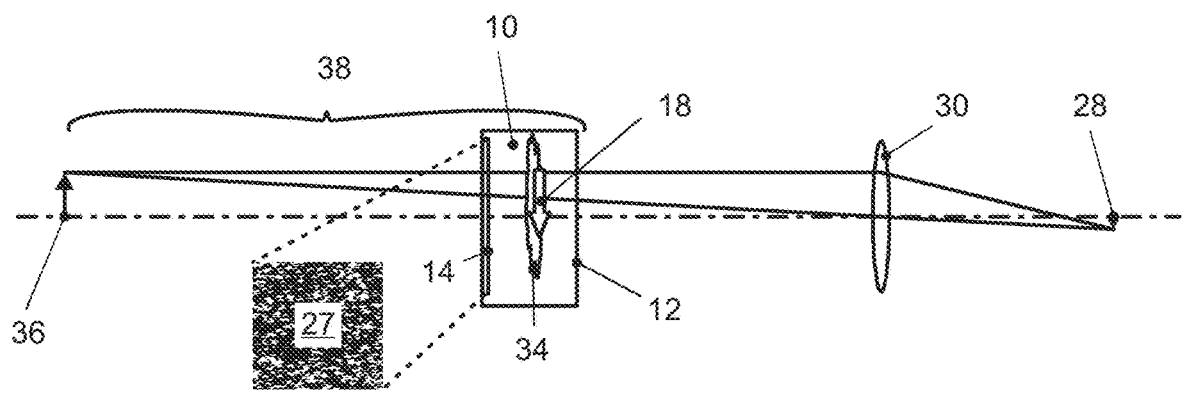
FIG. 2 is a schematic diagram illustrating preferred image detector settings when carrying out the method according to the invention.

As already explained in the context of the general description, it is preferably provided that the imaging optics 30, as schematically illustrated in FIG. 2, are focused on a point 36 behind the projection surface (of which only the rear wall 14 is shown in FIG. 2 for reasons of clarity), i. e. behind the laser speckle pattern 27. The laser speckles of all areas of the projection surface, including possible existing obstacle outer sides, are nevertheless sharply imaged on the image detector 28. The quantity essential for the sensitivity of the method, namely the distance between the refractive index perturbation and the patterned background, is thereby virtually enlarged. In this context, it is favorable if the imaging optics 30 are stopped down in such a way that the depth of field 38 still (sufficiently) sharply images the structures within the flow box 10 despite focusing on the distant point 36.

Of course, the embodiments discussed in the specific description and shown in the figures are only illustrative examples of embodiments of the present invention. The person skilled in the art is provided with a wide range of possible variations in light of the present disclosure. In particular, the method according to the invention is also suitable for visualizing flows in other types of spaces, for example, in forced-ventilated spaces. In any case, the application of the laser speckle variant has the advantage that a highly sensitive visualization is possible under spatially confined conditions.

LIST OF REFERENCE SIGNS

10 Flow box
12 Front wall of 10
14 Back wall of 10
16 Air connection
18 Primary gas flow
20 Working table
21 Obstacle
22 Air outlet
24 Laser
26 Deflection and expansion optics
27 Laser speckle pattern
28 Image detector
30 Imaging optics
32 Diffuser
34 seed gas/gas mixture
36 Sharp point
38 Depth of focus

The invention claimed is:

1. A method for detecting primary gas flows (18) in a flow chamber (10), the method comprising:
   causing a primary gas (18) to flow in the flow chamber (10);
   locally seeding the primary gas (18) with a gas mixture (34) including a seed gas that moves with the primary gas (18) and has a refractive index that can be distinguished from the primary gas (18);
   carrying out an imaging detection using an image detector (28) and imaging optics (30) arranged in front of the image detector (28) for performing a background schlieren measurement method to detect a movement of the gas mix re (34) that e of the flow of the primary gas (18); and
   the gas mixture (34) being composed in such a way that:

$|m_P - \Sigma_{i=1}^{N} a_i m_i| < 2$ g/mol, and $|n'_P - \Sigma_{i=1}^{N} a_i n'_i| > 70$, where $m_P$ is the molar mass and $n'_P$ is the refractive index of the primary gas, $m_i$ is the molar mass and $n'_i$ is the refractive index of the i-th gas component of the seed gas, N is the number of gas components of the seed gas, and $a_i$ is their respective relative mole fraction in the seed gas,
   so that a co-movement of the gas mixture (34) with the primary gas (18) flowing at a flow velocity of 0.1 to 1.0 m/s takes place without relative movement.

2. The method of claim 1, wherein
   the gas mixture (34) contains 20+/−1% $O_2$.

3. The method of claim 1, wherein
   the gas mixture (34) is prepared from two to five pure gases as its gas components.

4. The method of claim 1, wherein the gas mixture contains 25% He, 55% Ar and 20% $O_2$
   or 55% He, 25% Kr and 20% $O_2$
   or 65% He, 15% Xe and 20% $O_2$,
   in each case with a tolerance of +/−1% of the amounts of the individual gas components adding up to 100%.

5. The method of claim 1, further comprising:
   generating a patterned background for the background schlieren measurement method by coherent illumination of a projection surface arranged in a field of view of the image detector behind the primary gas flow.

6. The method of claim 5, wherein
   at least portions of the projection surface are formed by a boundary wall of the flow chamber.

7. The method of claim 5, wherein
   at least regions of the projection surface are formed by an outer wall of an object arranged in the flow chamber.

8. The method of claim 5, further comprising:
   focusing the imaging optics (30) on a point (36) located behind the projection surface (14).

9. The method of claim 1, further comprising:
   stopping down the imaging optics (30) in such a way that the primary gas flow (18) lies in the sharply imaged distance range.

10. The method of claim 1, wherein
    the seeding of the primary gas (18) with the gas mixture (34) is carried out by one or more diffusers (32).

11. The method of claim 10, wherein
    the one or more diffusers (32) together with a supply line for the gas mixture (34) are movably arranged within the flow chamber (10).

12. The method of claim 1, wherein
    the gas mixture (34) exclusively contains gas components that are non-toxic and non-asphyxiating for humans.

* * * * *